United States Patent [19]

Beausoleil et al.

[11] 3,858,189

[45] Dec. 31, 1974

[54] MAGNETO RESISTIVE SIGNAL MULTIPLIER FOR SENSING MAGNETIC BUBBLE DOMAINS

[75] Inventors: William F. Beausoleil, Hopewell Junction; George E. Keefe, Montrose; Ernest L. Walker, Wappingers Falls, all of N.Y.

[73] Assignee: International Business Machines Corporation, Armonk, N.Y.

[22] Filed: Dec. 29, 1972

[21] Appl. No.: 319,408

[52] U.S. Cl.340/174 EB, 340/174 CA, 340/174 HA, 340/174 TF, 340/174 YC

[51] Int. Cl. ........................ C11c 19/00, G11c 11/14

[58] Field of Search... 340/174 TF, 174 EB, 174 BC

[56] References Cited

UNITED STATES PATENTS 3,638,208 1/1972 Chow .......................... 340/174 TF

OTHER PUBLICATIONS

IBM Technical Disclosure Bulletin, Vol. 14, No. 7, Dec. 1971, pg. 2218–2219.

*Primary Examiner*—James W. Moffitt
*Attorney, Agent, or Firm*—Jackson E. Stanland

[57] ABSTRACT

A plurality of magneto-resistive sensing elements are connected in series and positioned adjacent magnetic bubble domain propagation paths in a compressor circuit. If a data representing bubble is injected into the beginning of the circuit, each bubble already present is forced over to the next idler position. As the bubbles pass the sensing elements their magnetization vectors are rotated producing corresponding changes in the resistance values of the sensors, which may be easily detected as a large magnitude signal indicating the presence of a data bubble.

7 Claims, 3 Drawing Figures

MAGNETO RESISTIVE SIGNAL MULTIPLIER FOR SENSING MAGNETIC BUBBLE DOMAINS

BACKGROUND OF THE INVENTION

1. Field of the Invention

This invention relates in general to the detection of magnetic bubble domains, and more particularly to an apparatus for detecting such bubbles using magneto-resistive sensors and providing greatly improved signal magnitudes.

2. Description of the Prior Art

The recent development of magnetic bubble domain technology holds great promise in enabling the long sought after concept of a multi-function data handling medium, i.e., one in which both storage and processing functions can be implemented in the same data bit supporting medium. As applied to magnetic bubble domains, it is contemplated that the storage function could be implemented in one region of an orthoferrite or garnet magnetic material, while various arithmetic or logic functions are performed on the stored data in a different region. This concept raises the natural problem of sensing or detecting information, as represented by magnetic bubble domains, in the storage region and communicating such information rapidly and efficiently to the processing region.

One way of implementing such remote sensing and communications is disclosed in U.S. Pat. No. 3,623,034 issued on Nov. 23, 1971 to Bonyhard and Danylchuk. The scheme contemplated in this patent involves a series string of bubble idler positions defined by magnetically soft strip overlays on the platelet, and is commonly referred to in the art as a compressor circuit. When the string is fully loaded with a bubble at each idler position, such bubbles normally move in a circular manner in their idler paths under the influence of a rotating in-plane field. When a bubble representing an information bit to be sensed is injected at one end of the string, however, magnetic interaction forces each bubble in the string to move over one idler position, and the bubble thus ejected from the last idler position on the far end of the string may then be detected by an adjacent sensing coil or other suitable means.

One disadvantage of sensing information bubbles at remote distances via a compressor circuit as described above is that if for some reason one or more of the idler bubbles does not advance to the next position in the expected domino manner, an information bit is thereby lost. This can be a significant problem and present an unacceptably high error probability when it is considered that the compressor circuit may comprise fifty or more series connected idler positions in the chain.

The development of bubble domain technology has also been characterized by additional problems concerning the different types of bubble sensors per se that have been proposed and used, including inductive coils, Hall effect devices, Faraday effect optical sensors, etc. In general, the majority of such sensors are either difficult and costly to implement, are dynamic rather than static in that they can only detect moving bubbles, or exhibit low signal-to-noise ratios. A recent improvement in the bubble sensor area which largely overcomes these problems is the use of magneto-resistive elements as bubble sensors, as described in detail in U.S. Pat. No. 3,691,540 issued Sept. 12, 1972 to George S. Almasi et al. Briefly, a small magneto-resistive element is placed adjacent a magnetic material as an overlay adjacent a bubble propagation path. When a bubble is sufficiently proximate the element the magnetization vector of the latter rotates approximately 90° which causes a sharp and easily detectable change in its resistance.

SUMMARY OF THE INVENTION

The present invention provides an apparatus for overcoming the above noted disadvantages of the prior art by utilizing a plurality of series connected magneto-resistive bubble sensing elements located between the idler positions adjacent the overlay strips extending between neighboring idler positions. When a bubble to be sensed is injected at the beginning of the compressor string and forces each idler bubble to move over one position during subsequent rotation of the in-plane field, each idler bubble is sensed during such movement by an adjacent magneto-resistive sensor. Since all of the sensors are connected in series the magnitude of the overall sense signal is represented by the magnitude of the sense signal $V_s$ from a single magneto-resistive element times the number of stages in the compressor string, thus effecting a direct signal multiplication as compared with the prior art techniques. In addition, if for some reason an idler bubble in the string fails to respond as predicted, a meaningful sense signal will still be generated by the bubbles in the string preceding it - thus providing some measure of fail safe protection.

As in the aforementioned U.S. Pat. No. 3,691,540, the magneto-resistive elements may be directly incorporated in the propagation strips rather than being provided separately. A bubble generator and a bubble imploder will normally be provided at the beginning and end, respectively, of the compressor string to replace the initial bubble forced over by a data representing bubble and to destroy the idler bubble ejected from the end of the string. If noise levels become a problem, the magneto-resistive elements can easily be connected in a common bridge circuit with inactive, pure resistive elements to effect noise cancellation.

DESCRIPTION OF A PREFERRED EMBODIMENT

Figure 1:
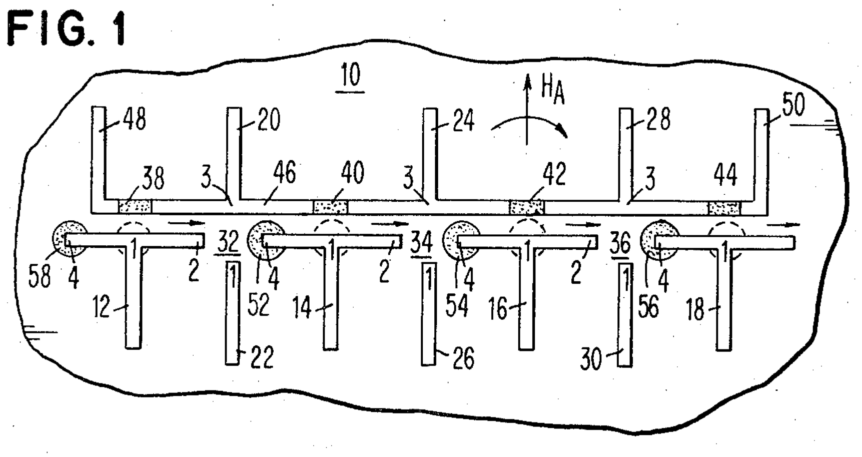
FIG. 1 shows a top view of a portion of a magnetic material carrying part of a compressor string and series connected magneto-resistive sensing elements in accordance with the teachings of the invention.

FIG. 1 shows a top view of a section of a magnetic medium 10 made of orthoferrite or garnet material and capable of supporting single wall magnetic bubble domains. It is understood that the medium is subjected to the usual magnetic bubble supporting bias field normal to the surface thereof. Medium 10 is provided with a plurality of magnetically soft strip overlays, such as permalloy, including T-bars 12, 14, 16 and 18, and I-bars 20, 22, 24, 26, 28 and 30. The arrangement of the strips is such as to define bubble idler positions 32, 34 and 36. Four magneto-resistive sensing elements 38, 40, 42 and 44 are provided adjacent the T-bar junctions and are electrically connected in series by a strip conductor 46 having severed terminal ends 48 and 50. Both the sensing elements and the conductor 46 may also be formed of permalloy as described in U.S. Pat. No. 3,691,540. Only four T-bars and sensing elements have been shown for the sake of simplicity. As is apparent, any number of sensing elements and idler positions may be used in actual practice.

When magnetic bubble domains 52, 54 and 56 have been generated in the medium 10 and propagated to the idler positions 32, 34 and 36 by any suitable means, not shown, they will normally rotate in a clockwise direction between the strip ends 1, 2, 3, 4 in a well known manner under the influence of an in-plane rotating field $H_A$. When rotating in the idler positions, these bubbles are sufficiently remote from the magneto-resistive sensing elements as to have no appreciable effect on the resistances thereof.

If a bubble to be sensed is injected at the beginning of the compressor string, as shown at 58 in FIG. 1, magnetic interaction will cause this bubble as well as idler bubbles 52, 54 and 56 to all move to the next idler position to the right during the next rotational cycle of field $H_A$, as generally shown by the dotted bubble outlines and accompanying arrows. As these bubbles pass closely adjacent the magneto-resistive sensing elements their magnetization vectors are rotated approximately 90° which causes a sharp change in their resistance values. These changes may be readily and easily detected in any suitable manner, as for example by connecting a constant current source and voltmeter across terminal ends 48 and 50.

Since the net resistance change detected is the sum of the changes in each of the magneto-resistive sensing elements, an overall sense signal of exceptionally high magnitude is produced. Furthermore, if for some reason bubble 54 fails to move over to the next idler position 36 in the predicted manner, a meaningful sense signal is still produced by the combined outputs from the elements 38 and 40.

The data bubble 58 need not be the actual data bubble in storage, of course, but may instead be a bubble split from the data bubble or one generated in response to the presence thereof. The means for generating bubble 58 and the means for imploding bubble 56 as it is ejected from the compressor string may take any well known form, and such means have not been shown in the interest of simplicity.

As is also apparent, a data zero would be sensed if no bubble 58 were injected into the string during a given clock period. In this case the bubbles 52, 54 and 56 would simply continue to rotate in their respective idler positions 32, 34 and 36.

The detection of the resistance values of the magneto-resistive sensing elements need not be done on a continuous basis, but rather the readout may be performed during each cycle at the instant that the shifting idler bubbles would be at the 1 positions of the T-bar junctions. This periodic or clocked mode of operation is enabled by the fact that the magneto-resistive sensing elements respond to the mere presence, rather than only the dynamic motion, of bubbles within sensing range.

Figure 2:
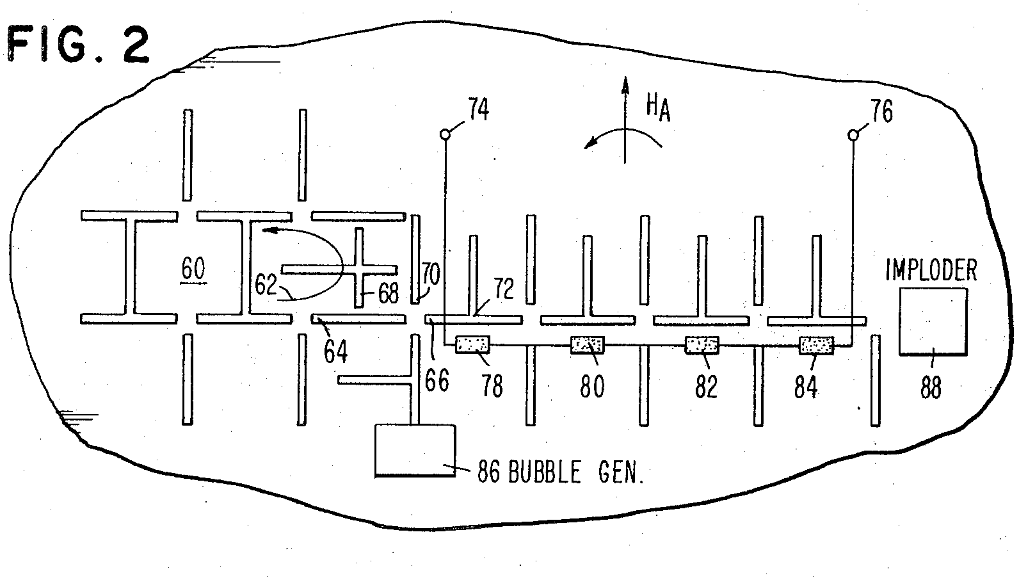
FIG. 2 shows, in simplified schematic form, a bubble sensing circuit according to the invention employed with a recirculating bubble shift register.

FIG. 2 shows a simplified schematic diagram of a magneto-resistive sensing arrangement of the type described above used in conjunction with a recirculating magnetic bubble shift register 60. The left end of the register has been left open for simplicity, but as is well known in the art it would normally include a great many more stages to implement a typical data storage function of large capacity. The direction of recirculation is counter-clockwise as shown by arrow 62, as is the direction of rotation of the in-plane field $H_A$.

If a data bubble appears in the register at position 64 and an idler bubble is also present at position 66 in the compressor string, then during the next 90° rotation of the in-plane field the data bubble will propagate to position 68 and force the idler bubble, which would otherwise move to the lower I-bar tip 70, to move to the T-bar junction position 72. This will in turn force the remaining idler bubbles in the string to undergo corresponding movement and thereby produce the desired sense signal across terminals 74, 76 of the magneto-resistive sensing elements 78, 80, 82 and 84. The necessary bubble generator 86 and imploder 88 have been shown in simplified block form without including the usual control lines therefor.

Figure 3:
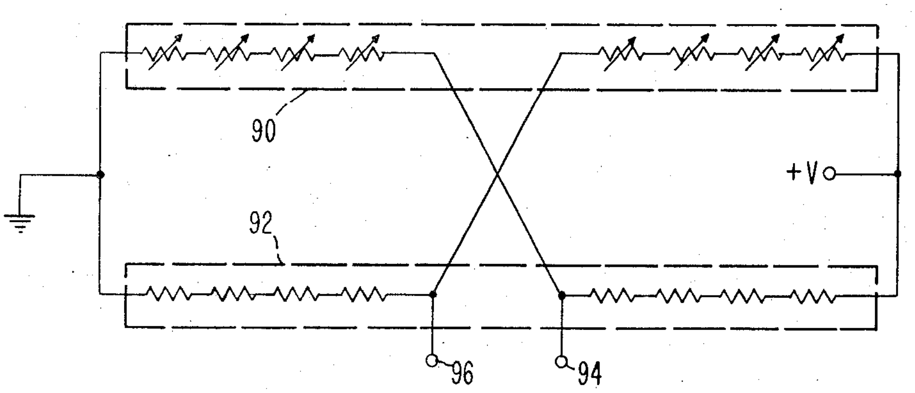
FIG. 3 shows a schematic diagram of a sensing circuit according to the invention connected in a bridge configuration to implement spurious noise cancellation.

If excessive noise becomes a problem, a bridge circuit as shown in FIG. 3 may be readily employed to effect the desired noise cancellation. The active magneto-resistive sensing elements are shown within block 90, while the inactive or dummy elements are shown within block 92. A sense amplifier would be connected across the bridge output terminals 94, 96 in the usual manner.

As will be apparent to those skilled in the art, various changes and modifications may be made to the structures described herein without departing from the spirit and scope of the invention, which is defined and limited solely by the language of the following claims.

What is claimed is:

1. A circuit for sensing magnetic bubble domains including a magnetic medium capable of supporting single wall magnetic bubble domains, propagation means located on the magnetic medium and defining a plurality of bubble idler positions connected in a series string by a plurality of propagation means disposed between adjacent idler positions, comprising:

a. a plurality of magneto-resistive sensing elements disposed adjacent the magnetic medium;

b. each sensing element lying adjacent a propagation means disposed between adjacent idler positions; and c. means connecting the magneto-resistive sensing elements in series, whereby when magnetic bubble domains located at each idler position are caused to move to the next adjacent idler position in a given direction each such bubble produces a resistance change in an adjacent sensing element.

2. A circuit as defined in claim 1 further comprising a plurality of resistive elements, and means connecting the magneto-resistive sensing elements and the resistive elements in a bridge configuration to effect noise cancellation.

3. In a magnetic bubble domain apparatus comprised of a magnetic medium in which said bubble domains can be moved during application thereto of repetitive drive cycles of applied magnetic fields, a sensing means for detecting one of said magnetic bubble domains, comprising:

a plurality of bubble domain storage positions for holding first bubble domains therein during cycles of said applied magnetic fields until said one bubble domain causes said first bubble domains to move from said storage positions, propagation means located between said storage positions for guiding said first bubble domains from one storage position to another when said one bubble domain causes one of said first bubble domains to move from its storage position, and sensing elements located adjacent to said propagation means for detecting said first bubble domains when said first bubble domains move from their storage positions in response to the presence of said one bubble domain, said sensing elements providing output signals which are combined to provide an amplified signal representative of the presence of said one bubble domain.

4. The apparatus of claim 3, where said sensing elements are connected together.

5. An apparatus for sensing a data magnetic bubble domain in a magnetic medium, comprising:

propagation means for moving bubble domains in said medium in a first direction in response to successive reorientations of a magnetic field substantially in the plane of said magnetic medium, means for preventing continual movement of said domains in said first direction during successive reorientations of said magnetic field in the absence of said data bubble, input means for providing said data bubble domain to be detected, said input means including means for bringing said data bubble to said means for preventing causing said bubble domains to be pushed away from said means for preventing, sensing means for detecting said bubble domains when they move away from said means for preventing, said sensing means providing an additive output representing the simultaneous presence of a plurality of said bubble domains, thereby providing an amplified indication of the presence of said data bubble domain.

6. An apparatus for sensing magnetic bubble domains in a magnetic medium, said apparatus including propagation means defining a plurality of bubble idlers, a plurality of sensing elements sufficiently removed from said idlers that bubble domains in said idlers will not be substantially detected by said sensing elements, input means for providing a data bubble domain to be sensed, said input means including means for injecting said data bubble domain into one of said idlers thereby causing bubble domains in each of said idlers to move from said idlers into positions sufficiently close to said sensing elements that said bubble domains will be detected by said elements to produce output signals, said sensing elements being connected in a manner that said output signals are combined to produce an amplified output signal representative of said data bubble domain.

7. The apparatus of claim 6, where said sensing elements are magneto-resistive sensing elements connected in series.

* * * * *

PO-1050
(5/69)

UNITED STATES PATENT OFFICE
CERTIFICATE OF CORRECTION

Patent No. 3,858,189 Dated December 31, 1974

Inventor(s) William F. Beausoleil, George E. Keefe, Ernest L. Walker

It is certified that error appears in the above-identified patent and that said Letters Patent are hereby corrected as shown below:

Column 4, line 39, delete "located on the magnetic medium and".

Signed and sealed this 15th day of April 1975.

(SEAL)
Attest:

RUTH C. MASON
Attesting Officer

C. MARSHALL DANN
Commissioner of Patents
and Trademarks